(12) United States Patent
Sato et al.

(10) Patent No.: US 8,897,620 B2
(45) Date of Patent: *Nov. 25, 2014

(54) TERMINAL DEVICE

(75) Inventors: Jun Sato, Kawasaki (JP); Toru Terauchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 372 days.

This patent is subject to a terminal disclaimer.

(21) Appl. No.: 13/460,161

(22) Filed: Apr. 30, 2012

(65) Prior Publication Data

US 2012/0213488 A1  Aug. 23, 2012

Related U.S. Application Data

(63) Continuation of application No. 11/497,731, filed on Aug. 2, 2006, now Pat. No. 8,189,997.

(30) Foreign Application Priority Data

Feb. 24, 2006 (JP) ................................ 2006-048801

(51) Int. Cl.
| | |
|---|---|
| H04N 9/80 | (2006.01) |
| H04N 5/92 | (2006.01) |
| H04N 5/93 | (2006.01) |
| H04N 21/418 | (2011.01) |
| H04N 21/442 | (2011.01) |
| H04N 9/82 | (2006.01) |
| H04N 7/16 | (2011.01) |
| H04N 21/43 | (2011.01) |
| H04N 21/432 | (2011.01) |
| H04N 5/913 | (2006.01) |
| H04N 5/907 | (2006.01) |

(52) U.S. Cl.
CPC ......... *H04N 9/8205* (2013.01); *H04N 21/4184* (2013.01); *H04N 21/4424* (2013.01); *H04N 7/163* (2013.01); *H04N 21/4305* (2013.01); *H04N 5/907* (2013.01); *H04N 21/4325* (2013.01); *H04N 5/913* (2013.01)
USPC ........... 386/252; 386/239; 386/248; 386/326; 386/353

(58) Field of Classification Search
USPC ................. 386/239–262, 291–299, 326–352, 386/353–357
See application file for complete search history.

(56) References Cited

U.S. PATENT DOCUMENTS

| | | |
|---|---|---|
| 6,665,316 B1 | 12/2003 | Eidson |
| 6,785,192 B2 | 8/2004 | Ukita et al. |

(Continued)

FOREIGN PATENT DOCUMENTS

| | | |
|---|---|---|
| JP | 2002-116960 A | 4/2002 |
| JP | 2003-167788 A | 6/2003 |

(Continued)

OTHER PUBLICATIONS

Japanese Office Action dated Jul. 27, 2010, and English translation thereof, issued in counterpart Japanese Application No. 2006-048801.

(Continued)

*Primary Examiner* — Hung Dang
(74) *Attorney, Agent, or Firm* — Holtz, Holtz, Goodman & Chick PC (57) ABSTRACT

A terminal device determines whether a clock is a secure clock or a self-running clock. If the clock is the self-running clock, the device stores a clocking time of the clock as a timestamp file in a memory card in recording content. In playing back the content, the device determines validity of a clocking time using the timestamp file to play back the content and also updates the stored time of the stored time as the timestamp file to a content playback start time. In contrast, if the clock is the secure clock, the device stores the timestamp file indicating a recording time of the content in the memory card only in recording the content and omits updating the stored time as the timestamp file in playing back the content.

8 Claims, 6 Drawing Sheets

(56) References Cited

U.S. PATENT DOCUMENTS

| | | | |
|---|---|---|---|
| 2002/0046401 A1* | 4/2002 | Miyazaki et al. | 725/32 |
| 2006/0294017 A1 | 12/2006 | Kim et al. | |
| 2007/0031116 A1* | 2/2007 | Takatsuka et al. | 386/95 |
| 2008/0263582 A1 | 10/2008 | Okamoto et al. | |

FOREIGN PATENT DOCUMENTS

| | | |
|---|---|---|
| JP | 2003-169376 A | 6/2003 |
| JP | 2003-169377 A | 6/2003 |
| JP | 2003-186755 A | 7/2003 |
| JP | 2003-272286 A | 9/2003 |
| JP | 2003-345662 A | 12/2003 |
| JP | 2004-021882 A | 1/2004 |
| JP | 2005-018378 A | 1/2005 |
| JP | 2005-165816 A | 6/2005 |
| JP | 2005-165963 A | 6/2005 |
| JP | 2004-326277 A | 11/2005 |
| WO | WO 2006/019158 A1 | 2/2006 |

OTHER PUBLICATIONS

*Content Protection for Recordable Media Specification*, SD Memory Card Book, SD-Video Park, Intel Corporation, International Business Machines Corporation, Matsushita Electric Industrial Co., Ltd., Toshiba Corporation, Revision 0.95, Oct. 31, 2005, pp. i-x, and pp. 1-55.

* cited by examiner

TERMINAL DEVICE

CROSS-REFERENCE TO RELATED APPLICATIONS

This is a Continuation of U.S. application Ser. No. 11/497,731, filed Aug. 2, 2006, which is based upon and claims the benefit of priority from prior Japanese Patent Application No. 2006-048801, filed Feb. 24, 2006, the entire contents of both of which are incorporated herein by reference.

BACKGROUND OF THE INVENTION

1. Field of the Invention

The present invention relates to, for instance, a terminal device, such as a personal computer, cellular phone, a personal digital assistant (PDA) and a portable audio player, and more specifically to a device equipped with a function of recording/playing back of content.

2. Description of the Related Art

In recent years, a growing number of terminal devices, such as a notebook-sized personal computer and a cellular phone equipped with a function of playing back content which has been received via communication network or recorded on a recording medium are deployed in the market. With using such devices, a user may play back content including favorite tunes and videos to enjoy them anywhere, and it is very convenient for the user.

Meanwhile, recently, to protect copyright, content with playback validity period and a playback expiration date set thereto have been increasingly deployed for a while. For playing back such types of content, a conventional information terminal device compares the playback validity period and the playback expiration date set to the content with a current time clocked by a built-in clock. The conventional terminal device is so constituted as to execute a content playing back operation, if the current time is within the playback validity period or the playback expiration date.

However, in general, the built-in clock in the terminal device has a clocking error depending on a self-running clock, i.e. drift of timing. Therefore, a terminal device having a built-in clock with a large clocking error cannot accurately manage the playback time limit of the content. The built-in clock installed in such type of terminal device generally has a function of a time adjustment by hand so that the user can freely adjust its clocking time. Accordingly, if the user changes the clocking time of the built-in clock backwards on purpose, even when the validity period expires, the terminal device becomes possible to play back the content even when the content is out of the expiration date, and as a result, the terminal device cannot prevent illegal use of the content.

Therefore, a terminal device employing a secure clock, as a built-in clock, having a function to receive accurate standard time data from a cellular phone base station and adjust the clocking time on the basis of the standard time has been proposed. With using this type of terminal device, the user may determine the playback time limit of the content on the basis of the clocking time tuned to the standard time data. So that, it becomes possible to accurately determine the playback time limit by eliminating influence of the clocking error caused by the built-in clock. And also it becomes possible to prevent the illegal use of the content by eliminating influence of an intentional change in clocking time by the user (for instance, Jpn. Pat. Appln. KOKAI Publication No. 2003-169376).

On the other hand, in a CPRM for SD-video 0.94 specifications that are storage specifications for movie video content in a memory card, new specifications of the "Time Usage Rule" not using the secure clock have been employed. This specification set a timestamp file common to content in a secured area of the memory card and updates the time of the timestamp file to the clocking time by the built-in clock at playback start time and playback completion time of the content, respectively. In playing back the content, the terminal device compares the clocking time of the built-in clock with the time of the timestamp file and determines that the clocking time of the built-in clock is possible to be altered if the time of the built-in clock is older than that of the timestamp file then does not play back the content (for example, refer to http://www.4centity.com/ "CPRM for SD-Video 0.94 specifications").

However, in the aforementioned each proposal, there are problems described below. That is, a proposal disclosed in the foregoing Jpn. Pat. Appln. KOKAI Publication No. 2003-169376 cannot be employed to a terminal device not having the secure clock therein. In contrast, the latter specifications disclosed in http://www.4centity.com/ "CPRM for SD-Video 0.94 specifications" is applicable to the device not having the secure clock. But the terminal device not having the secure clock has to perform time update processing of the timestamp file at every playback of the content. In general, in playing back the content, the terminal device ought to perform only reading-out processing of the content from the memory card. However, in the playback start time and playback completing time of the content, writing-in processing of data to the memory card is required, respectively, so that the terminal device has a problem such that a load of playback start processing and playback completion processing on the terminal device becomes heavy.

BRIEF SUMMARY OF THE INVENTION

The present invention is invented by aiming at the aforementioned situations, and an object of the invention is to provide a terminal device which eliminates influence of a clocking error and an alteration caused by a built-in clock, makes it possible to accurately manage a playback time limit and also reduces a process load on the terminal device in playing back content to smoothly perform playback processing thereof.

A first aspect of the present invention to achieve the object is a point in that a terminal device, recording content on a storage medium and also having a function to read out the content from the storage medium and play back it, has a secure clock to conduct a clocking operation in synchronization with standard time data acquired from outside and creates a timestamp file indicating a recording time of the content on the basis of the clocking time of the secure clock to store it on the storage medium.

A second aspect of the present invention is as follows. That is, the terminal device determines whether a built-in clock is the secure clock to conduct a clock operation in synchronization with the standard time data acquired from outside or a self-running clock to conduct a self-reliant clock operation. As the determination result, if the built-in clock is the self-running clock, the terminal device creates the timestamp file indicating the recoding time of the content in accordance with the clocking time of the clock in recording the content to store it on the storage medium, and also updates the time of the timestamp file in playing back the content, based on the clocking time. In contrast, if the clock is the secure clock, the terminal device stores the timestamp file indicating the recording time of the content only in recording the content so that it does not update the time of the timestamp file in playing back the content.

A third aspect of the present invention is as follows. If the terminal device has the secure clock, the terminal device determines whether or not a time correcting operation of the secure clock has been performed in a past certain time period. As the determination result, if the time correcting operation has not been performed in the past certain time period, the terminal device creates the timestamp file indicating the recording time of the content on the basis of the clocking time of the clock in recording the content to store it on the storage medium and also updates the time of the timestamp file in accordance with the clocking time by the clock in playing back the content. In contrast, if the time correcting operation has been conducted in the past certain time period, the terminal device stores the timestamp file indicating the recording time of the content on the storage medium only in recording the content so that the terminal device does not update the time of the timestamp file in playing back the content.

As described above, according to the present invention, it becomes possible to provide the terminal device which enables accurately managing the playback time limit by eliminating the influence of the clocking error and the alteration caused by the built-in clock and also enables smoothly performing playback processing of the content by reducing a processing load on the terminal device in playing back the content.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

Figure 1:
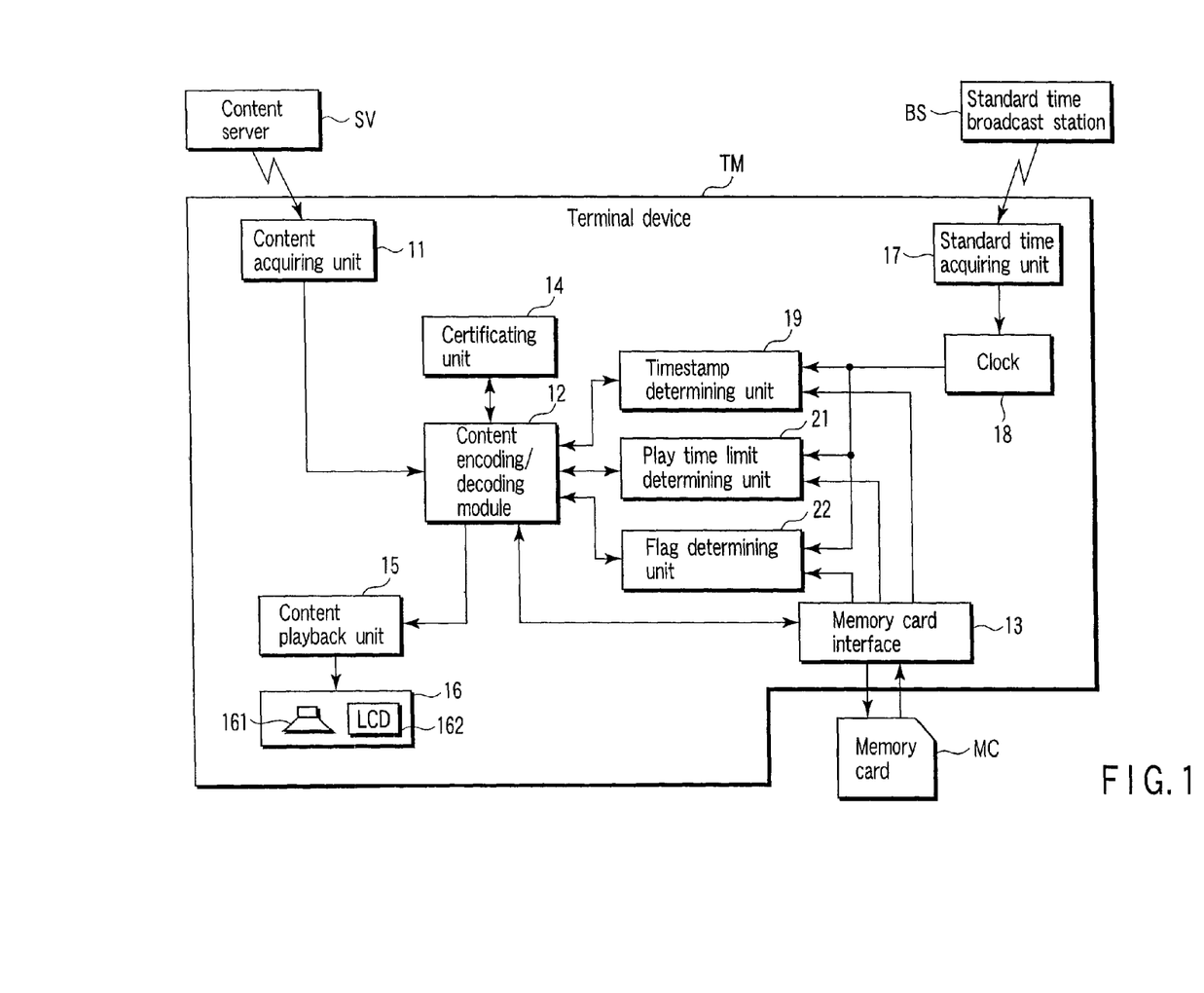
FIG. 1 is an exemplary functional block diagram showing a functional configuration of a terminal device regarding a first embodiment of the present invention.

FIG. 1 is a functional block diagram showing a functional configuration of a terminal device regarding a first embodiment of the present invention.

The terminal device regarding the first embodiment consists of, for instance, a cellular phone or a PDA. The terminal device is composed of a content acquiring unit 11, a content encryption/decryption module 12, a memory card interface 13, a certificating unit 14, a content playing back unit 15 and a content outputting unit 16. The terminal device is further comprised of a standard time acquiring unit 17, a clock 18, a timestamp determining unit 19, a playback time limit determining unit 21 and a flag-determining unit 22.

The content acquiring unit 11 accesses a content server SV disposed on, for instance, on the Web via a communication network (not shown), then, downloads content data from the content server SV. Content is composed of the content data and rights information indicative of copyright and it may be protected in some way.

The communication network consists of an Internet Protocol (IP) network represented by the Internet and a mobile communication network to access the IP network. The mobile communication network employs, for example, a code division multiple access (CDMA) system as a radio access system between a base station and a terminal device. As for a communication protocol between the content server SV and a terminal device TM, for instance, Transmission Control Protocol/Internet Protocol (TCP/IP) is available.

The content encryption/decryption module 12 conducts encryption processing to protect the copyright for the downloaded content to store the encrypted content in a memory card MC through the memory card interface 13. At this moment, the module 12 acquires a current time from the clock 18 to write in the current time in a below-mentioned timestamp file 31 of the memory card MC.

Figure 2:
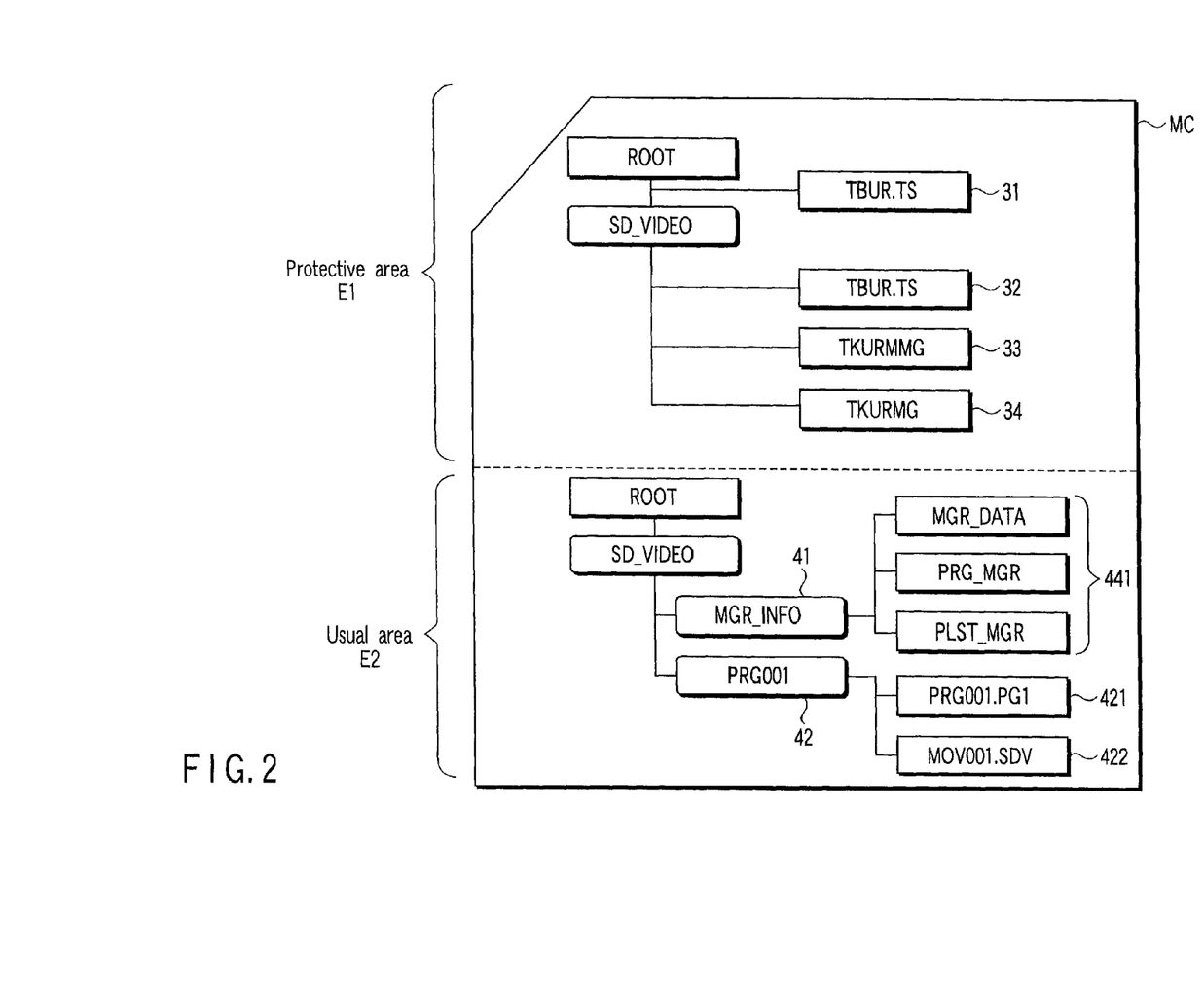
FIG. 2 is an exemplary view showing a recording format of a memory card mounted and used on and by the terminal device shown in FIG. 1.

The memory card MC consists of, for instance, a NAND-type flash memory and a storage area thereof has a protective area E1 and a usual area E2 as shown in FIG. 2. The protective area E1 stores timestamp files (TBUR.TSs) 31, 32, encryption key (TKURMG) 34 and its key management file (TKURMMG) 33. The usual area E2 stores a plurality of kinds of program management files (MGR_DATA, PGR_MGR, PLST_MGR) 411 as a program management directory (MGR_INFO) 41. The usual area E2 also stores a management file (PRG001.PGI) 421 of a program itself as a program (PRG001) 42 and content data (MOV001.SDV) 422.

Among of them, not only a key to encrypt the content but also the rights information of the content are stored in the (TKURMG) 34. The rights information includes information showing a playback time limit, a playback period (period from playback start to playback completion), the number of playbacks and a content usage rule in relation to copy or movement. And the flag mentioned below is also included in this rights information.

The standard time acquiring unit 17 receives standard time data transmitted from a standard time broadcast station BS to adjust the clocking time of the clock 18, based on the received standard time data. For instance, a base station in a CDMA mobile communication system inserts system time data into a synch channel signal to transmit it. The standard time acquiring unit 17 receives the synch channel signal to extract the system time data from the synch channel and adjust the clocking time of the clock 18 on the basis of the extracted system time data. In other words, in a state in which the standard time acquiring unit 17 periodically implements time adjusting operations, the clock 18 operates as the secure clock.

The timestamp determining unit 19 does not conduct a determining operation when the clock 18 normally operates as the secure clock. In contrast, when the clock 18 operates as a self-running clock, the timestamp determining unit 19 conducts the determining operation which as follows. That is, the determining unit 19 reads out timestamp files from the memory card MC through the memory card interface 13 to make the content encryption/decryption module 12 encrypt them in preference to the playback of the content. The determining unit 19 determines whether or not the current times at the clock 18 are later than the times of the timestamp files to transfer the determination result to the module 12 by comparing the current time of the clock 18 to the times of the encrypted timestamp files.

The playback time limit determining unit 21 retrieves the rights information from the memory card MC through the memory card interface 13 to make the module 12 decrypt them in preference to the playback of the content. The determination unit 12 then determines whether or not the flag included in the rights information has been set to transfer the determination result to the module 12.

The flag determining unit 22 reads out the rights information from the memory card MC through the memory card interface 13 to make the module 12 decrypt it. The flag determining unit 22 then determines whether or not the flag included in the decrypted rights information has been set to transfer the determination result to the module 12. This flag is set by the module 12 when it has been determined that the current time of the clock 18 is out of the playback expiration date at the determination at the past playback of the content.

The module 12 determines whether or not the playback conditions of the content are satisfied, based on each determination result from the timestamp determining unit 19, the playback time limit determining unit 21 and the flag determining unit 22. When the playback conditions are satisfied, the module 12 reads out encrypted content data from the memory card MC through the memory card interface 13 to decrypt it and transfers the decrypted content data to the content playing back unit 15.

If the decrypted content data is audio data, the content playing back unit 15 converts the audio data into an analogue signal then outputs it from a loudspeaker 161 of the content outputting unit 16. In contrast, if the decrypted content data is video data, the playing back unit 15 displays the video data to a liquid crystal display (LCD) 162 of the content outputting unit 16. The certificating unit 14 certificates the memory card MC before playing back the content.

Next to this, content recording/playing back operations by the terminal device configured as mentioned above will be set forth.

(1) Recording of Content

The terminal device TM accesses the content server SV via the communication network (not shown) from the content acquiring unit 11 to download the desired content. The content is encrypted by the content encryption/decryption module 12 in accordance with the predetermined encryption algorithm then stored in the memory card MC through the memory card interface 13.

Figure 3:
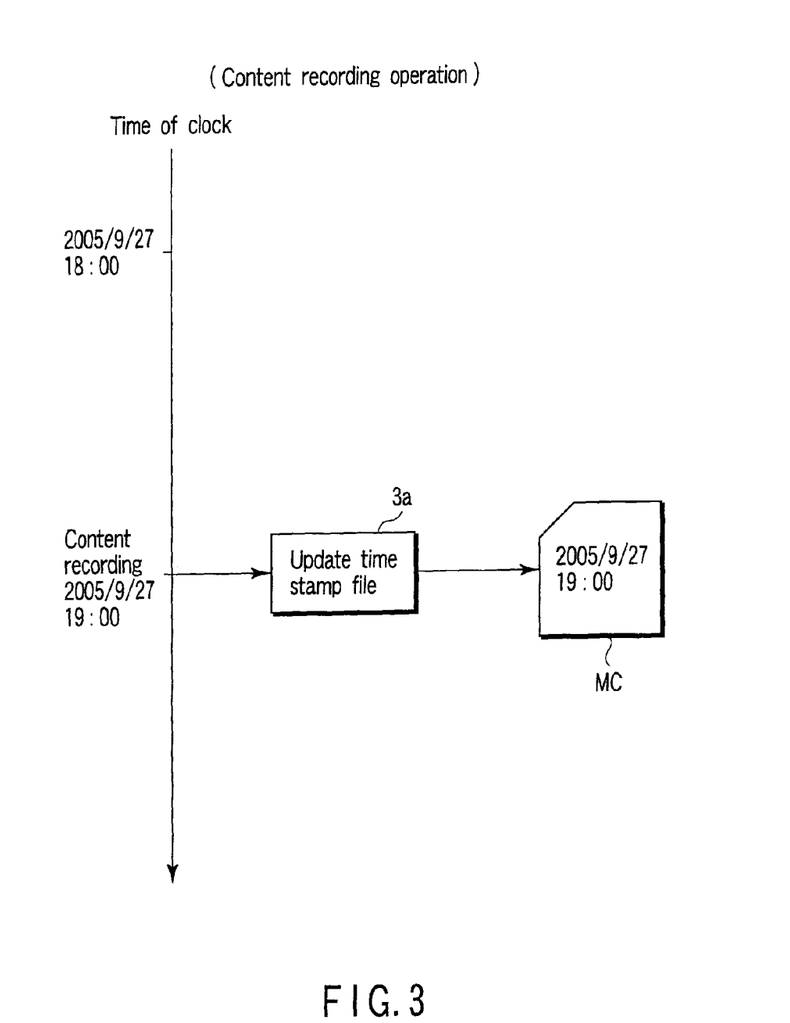
FIG. 3 is an exemplary flowchart for explaining update processing of a timestamp file in recording content by the terminal device shown in FIG. 1.

And at this moment, the module 12 acquires the information on the current time from the clock 18 to write the information into the timestamp file 31 of the memory card MC through the memory card interface 13. For instance, as shown in FIG. 3, if the time by the clock 18 is "2005/9/27 19:00" (19:00, Sep. 27, 2005), the module 12 writes the time into the timestamp file 31 on the memory card MC in step 3a.

(2) Playback of Content

Figure 4:
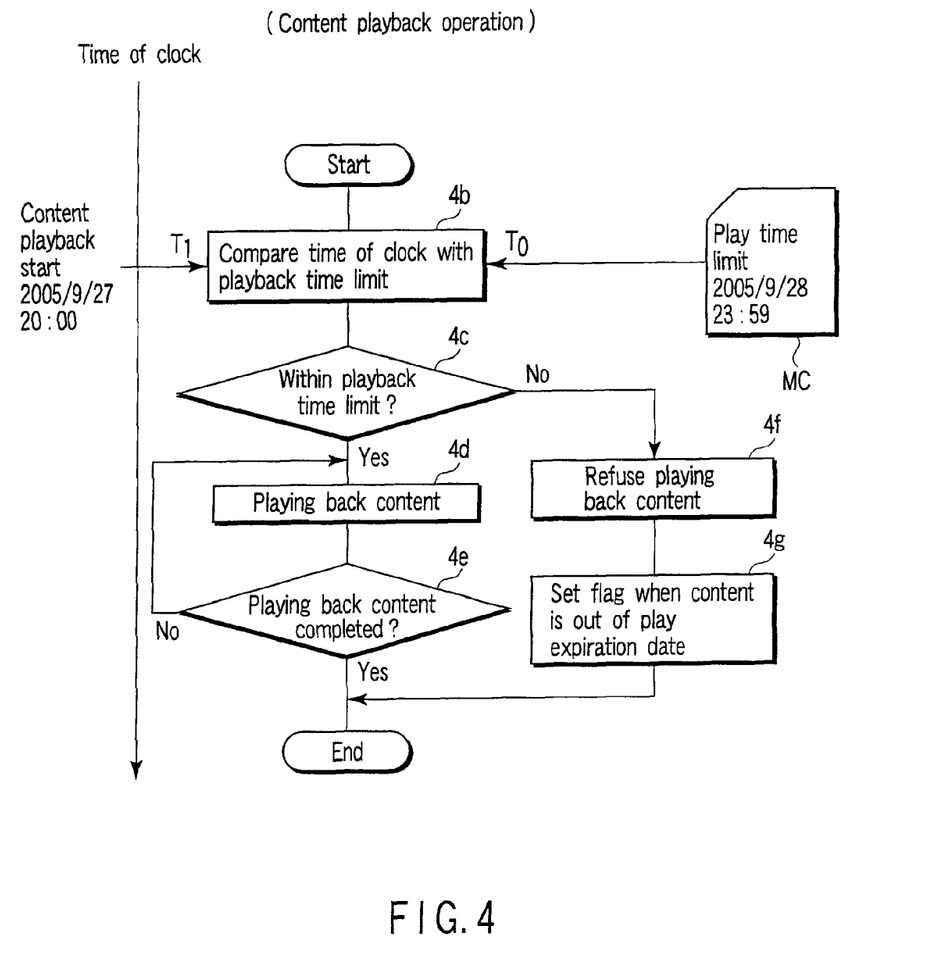
FIG. 4 is an exemplary flowchart for explaining a process procedure and a process content in playing back the content by the terminal device shown in FIG. 1.

It is presumed that the user loads the memory card MC onto the memory card interface 13 and the user, in this state, inputs a content playback request by means of an input unit (not shown). In such a case, in the terminal device TM, at first, the certificating unit 14 conducts certification processing on the basis of the key management file stored in the memory card MC. If the result of the certification processing has shown validity of the memory card MC, the terminal device TM executes playback processing of the content as follows. FIG. 4 is the flowchart showing the process procedure and the process content.

That is, the terminal TM firstly reads out the rights information of the content to be played back from the memory card MC through the memory card interface 13 to decrypt it by the content encryption/decryption module 12. The terminal device TM then determines whether or not the playback expiration data has been set in the content to be played back. If the determination result does not show the setting of the playback expiration date, the terminal device TM starts playing back the content.

In contrast, if the playback expiration date has been set, in step 4b, the playback time limit determining unit 21 compares a current time T1 of the clock 18 with the playback expiration date described in the decrypted rights information. Then, in step 4c, it is determined whether or not the current time T1 of the clock 18 is within the playback expiration date.

For instance, as shown in FIG. 4 now, if the current time T1 of the clock 18 is "2005/9/27, 20:00" (20:00, Sep. 27, 2005), and on the other hand, if the playback expiration date of the content is "2005/9/28, 23:59:59 (23:59:59, Sep. 28, 2005), it is determined that the current time T1 of the clock 18 is within the playback expiration date.

If it has been determined that current time T1 of the clock 18 is within the playback expiration date by the playback time limit determining unit 21, the module 12 determines that the playback conditions are satisfied for the content. Then the terminal device TM shifts to step 4d, where it reads out the encrypted content data from the memory card MC through the memory card interface 13. The terminate device TM decrypts the encrypted content data to transfer it to the content playing back unit 15. Therefore, the content playing back unit 15 play backs the content, thereby, if the decrypted content data is audio data, it is output from the loudspeaker 161, and in contrast, if the decrypted content data is video data, it is displayed on the LCD 162. The terminal device TM detects the playback completion of the content in step 4e, then, it terminates the playback operation without updating the timestamp files just as they are.

In contrast, if the playback time limit determining unit 21 determines that the current time T1 of the clock 18 has already expired. In this case, the terminal device TM makes a shift to a step 4f to refuse the playback of the content and displays the fact on the LCD 162. At the same time, the terminal device TM sets the flag in step 4g and includes the flag into the rights information to store it in the memory card MC.

As mentioned above, in the first embodiment, the secure clock impossible to alter its clocking time is used as the clock 18. Therefore, it becomes unnecessary for the terminal device TM to perform time update processing for the timestamp files in playing back the content, thereby, it become possible for the terminal device TM to smoothly play back the content by reducing the processing load thereon without causing playback delay or the like.

In recording the content, the clocking time of the clock 18 functioning as the secure clock is recorded on the memory card MC, as the timestamp file. Therefore, for instance, when other terminal device having only the self-running clock intends to play back the content recorded on the memory card MC, it become possible to conduct time check of the self-running clock of its other terminal device by using the recording time of the timestamp file. Thus, illegal playback of the content by altering the self-running clock by the terminal device can be prevented.

Furthermore, if the user intends to play back the content of which the playback exportation date has already expired, the playback of the content is refused and also the information on the fact is included in the rights information by setting the flag so as to be recorded on the memory card MC. Accordingly, if the user intends to play back the content by loading the memory card MC on another terminal device having only the self-running clock, even if the time of the terminal device is within the playback expiration date of the content, the playback of the content can be prohibited in accordance with the prior history of trying the playback after the expiration of the playback expiration date.

Second Embodiment

A second embodiment of the invention employs the following configuration. That is, at first, a terminal device TM determines whether or not a clock owned thereby is a secure clock tuned to a standard time. If the determination result shows that the clock is the self-running clock, the terminal device stores the clocking time of the clock in the memory card MC as the timestamp file in recording the content. Simultaneously, in playing back the content, the terminal device TM play backs the content after determining the validity of the clocking time at which the timestamp file has been used, and also updates the time of the timestamp file to the content playback start time. In contrast, if the clock is the secure clock, the terminal device stores the timestamp file indicating the recording time of the content only in recording the content in the memory card MC and does not update the time of the timestamp file.

Hereinafter, the operation of the terminal device TM regarding the second embodiment will be explained. Since the basic configuration of the terminal device TM and the configuration of the memory card MC are the same as the configurations in FIG. 1 and FIG. 2, also in the second embodiment, the operation of the terminal device TM will be described by quoting FIG. 1 and FIG. 2.

(1) Recording Content

The downloaded content is encrypted by means of the content encryption/decryption module 12 in accordance with the predetermined encryption algorithm, then, stored in the memory card MC through the memory card interface 13. The module 12, at this moment, acquires the information of the current time from the clock 18, even if the clock 18 is the secure clock, or even if it is the self-running clock. The module 12 then writes the information on the current time in the timestamp file 31 through the memory card interface 13. The timestamp recording processing in recording the content is the same as that of FIG. 3.

(2) Playing Back Content

Figure 5:
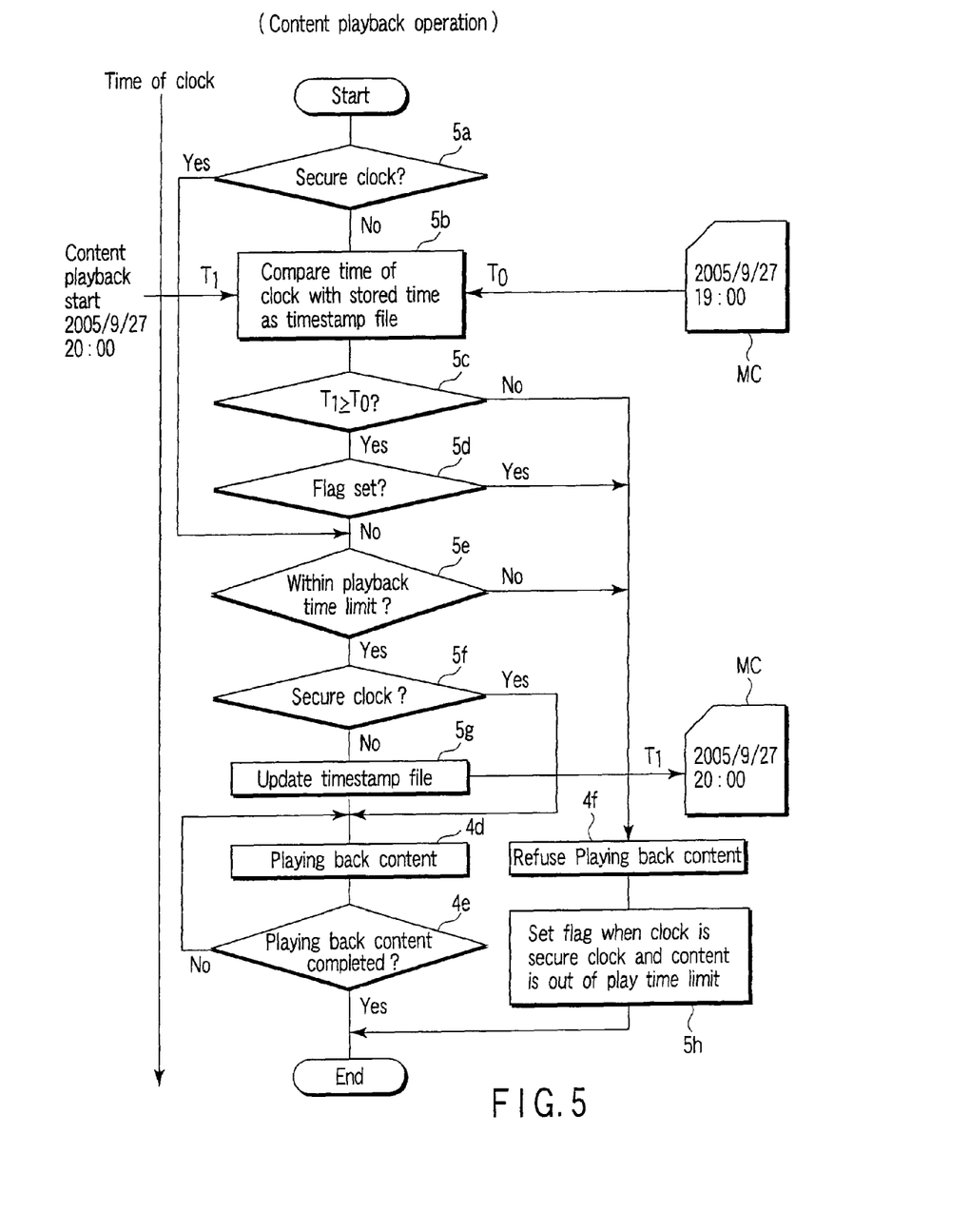
FIG. 5 is an exemplary flowchart showing a process procedure and a process content in playing back content by a terminal device regarding a second embodiment of the present invention.

The memory card MC is loaded on the memory card interface 13, and in this state, when the user inputs a content playback request through the input unit (not shown), the terminal device TM firstly certificates the memory card MC by the certificating unit 14 on the basis of the key management file stored in the memory card MC. If the result of the certification identifies the validity of the memory card MC, the terminal device executes the playback processing of the content as follows. FIG. 5 is the flowchart showing the process procedure and the process content. In FIG. 5, the same units will be given the same reference symbols to explain them.

At first, the terminal device TM reads out the rights information of the content to be played back from the memory card MC through the memory card interface 13 to decrypt the rights information by the content encryption/decryption module 12. Based on the decrypted rights information, the terminal device TM determines whether or not the playback expiration date has been set for the content to be played back. As the determination result, if the playback expiration date has not been set, the terminal device TM switches to step 4*d* to start the playback of the content.

In contrast, if the playback expiration date has been set, the terminal device TM firstly determines if the clock 18 is the secure clock or the self-running clock in step 5*a*. This determination is performed, for instance, as follows. The terminal device TM stores the last time at which the clock 18 has been applied a time adjustment on the basis of the standard time data. The terminal device TM then determines that the clock 18 is the secure clock until a certain time period will elapse from the stored last adjustment time. In contrast, after the elapse of the certain time period, the terminal device TM determines that the clock 18 is the self-running clock.

If the determination result shows that the clock 18 is the secure clock, the terminal device TM shifts to step 5*e*, where the playback time limit determining unit 21 compares the current time T1 of the clock 18 with the playback expiration date described in the decrypted rights information to determine whether or not the current time T1 of the clock 18 is within the playback expiration date, in step 5*e*. With this determination, when it is determined that the current time T1 of the clock 18 is within the playback expiration date, the terminal device TM determines that the playback conditions are satisfied for the content. The terminal device TM then, in step 5*f*, after re-confirming whether the clock 18 is the secure clock or not, and if the clock 18 is the secure clock, it changes over to step 4*d* to read out the encrypted content data from the memory card MC through the memory card interface 13. Then the terminal device TM decrypts the encrypted content data to transfer it to the content playing back unit 15. Thus, the playback processing of the content is conducted by the content playing back unit 15.

In contrast, if the determination result in step 5*a* shows that the clock 18 is the self-running clock, in this case, the terminal device TM shifts to step 5*b* and where, the timestamp determining unit 19 compares the current time T1 of the clock 18 with a time T0 of the timestamp file which has been read in from the memory card MC. In step 5*c*, it is determined whether or not the current time T1 of the clock 18 is later than the time T0 of the timestamp file.

For instance, it is assumed that the time T0 of the timestamp file of the memory card MC is "2005/9/27 19:00" (19:00, Sep. 27, 2005), and on the other hand, the current time T1 of the clock 18 is "2005/9/27 20:00" (20:00, Sep. 27, 2005) as shown in FIG. 5. As things are, the current time T1 of the clock 18 being later than the time T0 of the timestamp file, the time T1 of the clock 18 is regarded as normal, namely the time T1 has not been delayed and altered.

Subsequently, the terminal device TM skips step 5*d* to extract the flag from the rights information read out from the memory card MC by the flag determining unit 22, and then, determines whether or not the flag has been set. As the determination result, if the flag has been cleared, it is presumed that there is no history in which the content has been tried to be played back previously after expiring the expiration date. In contrast, if the flag is set, it is determined that there is history in which the content has been tried to be played back after expiring the expiration date.

In the case of the flag being clear, the terminal device TM shifts to step 52 sequentially. The playback time limit determining unit 21 compares the current time T1 of the clock 18 with the playback expiration date described in the decrypted rights information. Thereby, it is determined whether or not the current time T1 of the clock 18 is within the playback expiration date.

As the determination result, if it is determined that the current time T1 of the clock 18 is within the playback expiration date, the content encryption/decryption module 12 determines that the content satisfies the playback conditions. In step 5*f*, the module 12 determines again whether or not the clock 18 is the secure clock, and if it is not the secure clock, the terminal device TM makes a transition to step 5*g*. Then, the terminal device TM updates the time of the timestamp file to the current time of the clock 8, namely the content playback start time. As a result, for instance, if the current time T1 of the clock 18 is "2005/9/27 20:00", the timestamp file 31 of the memory card MC is updated to this time of "2005/9/27 20:00".

Having described that, in step 5*f*, it is determines whether the clock 18 is the secure clock or not; however the determination whether the clock 18 is the secure clock or not has been already performed in step 5*a*. So that, the terminal device TM may perform the determination processing in step 5*f*, but may branch the determination processing on the basis of the determination result in step 5*a*.

In contrast, in the determination in the step 5*f*, if it is determined that the clock 18 is the secure clock, the terminal device TM eliminates the update processing of the timestamp file to be performed in step 5*g* and takes a way to the content playback processing in step 4*d* directly.

After taking the way to step 4*d* in such a manner, the module 12 reads out the encrypted content data from the memory card MC through the memory card interface 13. Then, the module 12 decrypts the encrypted content data and transfers it to the content playing back unit 15. Accordingly, the content playing back unit 15 conducts the processing of playing back the content.

On the other hand, supposing that, it is determined that the time T1 of the clock 18 is abnormal from the determination result of the timestamp determining unit 19, it is determined that there is a history in which the content has been tried to be played back after the expiration of the time limit for the content in past from the determination result of the flag determining unit 22, or it is determined that the current time T1 of the clock 18 has elapsed the playback expiration date. As things stand now, the terminal device TM makes a shift to step 4*f* to refuse the playback of the content and display the fact on the LCD 162. If it is determined by the playback time limit determining unit 21 that the clock 18 is the secure clock and in such a state, the terminal device TM sets the flag and includes the flag in the rights information to store it in the memory card MC.

As mentioned above, in the second embodiment, it is determined that the clock 18 is the secure clock or the self-running clock. If it is determined that the clock 18 is the secure clock, the terminal device TM records the time of the clock 18 in the timestamp file only in recording the content and omits updating of the time of the timestamp file in playing back the content.

Accordingly, the time update processing of the timestamp file in playing back the content becomes useless, thereby, it becomes possible to reduce the processing load on the terminal device TM and smoothly play back without causing the playback delay, etc. The clocking times of the clock 18 are stored in the timestamp files in recording the content. Therefore, for instance, if another terminal having only the self-running clock intends to play back the content recorded on the memory card MC, it becomes possible to check the time of the self-running clock of the terminal device by using the recorded time of the timestamp file. Consequently, it becomes possible to prevent the illegal playback of the content by altering the self-running clock in the terminal device.

Further, in the second embodiment, when it is determined that the clock 18 is a self-running clock, the terminal device TM terminal performs the determination of the validity of the time T1 of the clock 18 by using the timestamp files, then, play backs the content, and also updates the times of the timestamp files to the content playback start times. Therefore, in preference to the playback of the content, it becomes possible to find the delay and the alteration of the clock 18 on the basis of the times of the timestamp files which have updated at the preceding playback of the content, thereby; the terminal device can surely prevent the illegal playback of the content.

Third Embodiment

A third embodiment of the present invention is constituted as follows. At first, when the clock owned by the terminal device TM is the secure clock, the terminal device TM determines whether or not the time correction based on the standard time of the secure clock has correctly conducted within a past certain time period. If it is determined that the time correction has performed correctly within the past prescribed time period, the terminal device TM eliminates validity determination processing of the clocking times by using the timestamp files and time update processing of the timestamp files. In contrast, if it is determined that the time correction has not performed correctly in the past certain time period, the terminal device executes the validity determination processing of the clocking time by using the timestamp files and the time update processing of the timestamp files.

Hereinafter, an operation of the terminal device TM regarding the third embodiment will be set forth. Since the basic configuration of the terminal device TM and the configuration of the memory card MC are the same as those of FIG. 1 and FIG. 2 which have already explained for the first embodiment, also in the third embodiment, those configurations will be described by quoting FIG. 1 and FIG. 2.

(1) Recording Content

The downloaded content is encrypted by the content encryption/decryption module 12 in accordance with the prescribed encryption algorithm, then, stored in the memory card MC through the memory card interface 13. At this moment, in a similar manner in the second embodiment, the module 12 acquires information on a current time from the clock 18, even if the clock 18 is the secure clock or the self-running clock. The module 12 then writes in the information on the current time in the timestamp file 31 of the memory card MC through the memory card interface 13 as shown in FIG. 3.

(2) Playing Back Content

Figure 6:
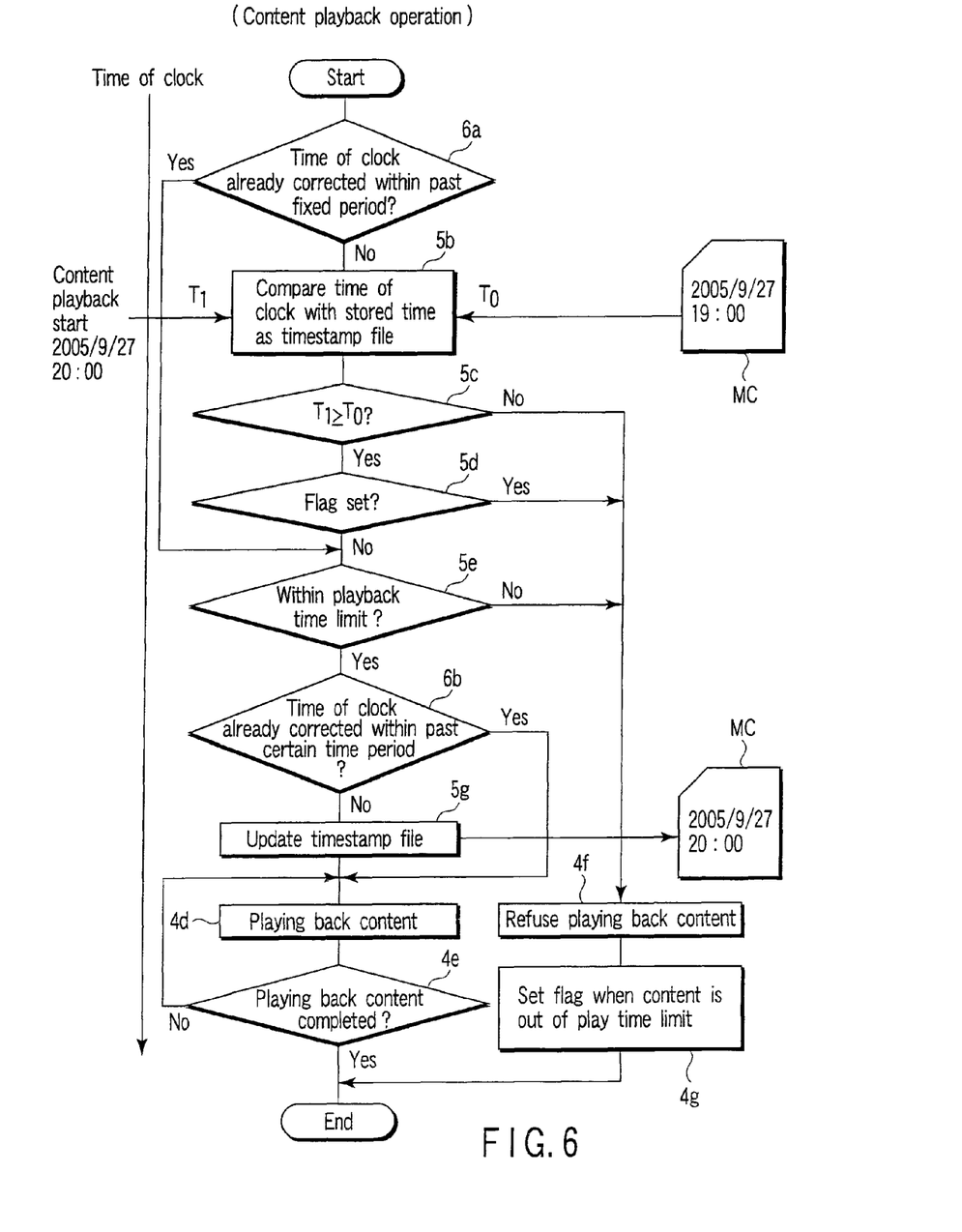
FIG. 6 is an exemplary flowchart showing a process procedure and a process content in playing back content by a terminal device regarding a third embodiment of the present invention.

When loading the memory card MC onto the memory card interface 13, and when the user inputs a content playing back request through an input unit (not shown) in this state, in the terminal device TM, at first, the certificating unit 14 certificates the memory card MC on the basis of the key management file stored therein. Then, if the validity of the memory card MC is confirmed as the result of the certification processing, the terminal device TM executes playback processing which follows. FIG. 6 is the flowchart showing the processing procedure and the processing content. In FIG. 6, the same units as those of FIG. 4 and FIG. 5 will be noted by the same reference symbols to describe them.

That is to say, the terminal device TM firstly reads out the rights information of the content to be played back from the memory card MC through the memory card interface 13 to decrypt the rights information by means of the content encryption/decryption module 12. Then, based on the decrypted rights information, it is determined whether or not the playback expiration date has been set to the content to be played back. As the determination result, if the playback expiration date has not been set, the terminal device TM shifts to step 4d to start the playback of the content.

In contrast, if the playback expiration date has been set, at first in step 6a, the terminal device TM determines whether or not the time of the clock 18 has been already adjusted in the past certain time period, based on the standard time data. This determination can be performed by storing the last time at which the clock 18 has been time-adjusted on the basis of the standard time data and by determining the time elapse from the last adjustment time.

If the determination result shows that the clock 18 has been already adjusted in the past certain time period, the terminal device TM makes a shift to step 5e as in the second embodiment. Then, in step 5e, the playback time limit determining unit 21 compares the current time T1 of the clock 18 with the playback expiration date described in the decrypted rights information. Based on the comparison result, the terminal device TM determines whether or not the current time T1 of the clock 18 is within the playback expiration date. As a result, if it is determined that the current time T1 of the clock 18 is within the playback expiration date, the terminal device TM determines that the content satisfies the playback conditions. Then, in the step 5f, after confirming again whether or not the clock 18 has been already adjusted in the past certain time period, if it has been adjusted, the terminal device TM shifts to step 4d. In step 4d, the terminal device TM reads out the encrypted content data form the memory card MC through the memory card interface 13. The terminal device TM then decrypts the encrypted content data to transfer it to the content playing back unit 15. Therefore, the content playing back unit 15 performs the playback processing of the content.

In contrast, it is supposed that the clock 18 has not been adjusted in the past certain time period as the result of the determination caused by step 6a. As matters stand now, the terminal device TM firstly shifts to step 5b in a similar way to the second embodiment. Then, the timestamp determining unit 19 compares the current time T1 of the clock 18 with the time T0 as the timestamp file which has been read from the memory card MC. In step 5c, it is determined whether or not the current time T1 of the clock 18 is later than the time T0 of the timestamp file.

As the determination result, if the current time T1 of the clock 18 is later than the time T0 of the timestamp file, the terminal device TM determines that the time T1 of the clock 18 is normal, namely it is not time-delayed and it is not altered, then, changes over step 5d. The flag determining unit 22 then extracts the flag from the rights information read out from the memory card MC to determine whether or not the flag has been set. As the determination result, if the flag has been cleared, it is presumed that there is not a history in which the playback of the content after the expiration of the expiration date has been tried previously. On the contrary, if the flag has been cleared, it is determined that there is a history in which the playback of the content after the expiration of the expiration date has been tried.

In the case in which the flag is cleared, the terminal device TM shifts to step 5e sequentially. The playback time limit determining unit 21 then compares the current time T1 of the clock 18 with the playback expiration date described in the decrypted rights information. And the determining unit 21 determines whether or not the current time T1 of the clock 18 is within the playback expiration date.

As a result of the determination described above, if it is determined that the current time T1 of the clock 18 is within the playback expiration date, the playback encryption/decryption module 12 determines that the playback conditions are satisfied for the content. In step 5f, the terminal device TM determines again whether or not the clock 18 has been already adjusted in the past certain time period, if there is any evidence of the adjustment in the certain time period, the terminal device TM shifts to step 5g. Then, the terminal device TM updates the time of the timestamp file to the current time of the clock 18, namely the content playback start times. As a result, for instance, if the current time T1 of the clock 18 is "2005/9/27 20:00", the timestamp file 31 of the memory card MC is updated to this "2005/9/27 20:00".

In contrast, if the determination in step 5f determines that the clock 18 has been adjusted within the certain time period in the past, the terminal device TM omits update processing of the timestamp file to be performed in step 5g, and shifts to the content playback processing in step 4d without making any change.

After shifting to step 4d, the content encryption/decryption module 12 reads out the encrypted content data from the memory card MC through the memory card interface 13. The module 12 then decrypts the encrypted content data to transfer it to the content playing back unit 15. Thus, it results in the content playback processing by means of the content playing back unit 15.

On the other hand, it is assumed that the determination result from the timestamp determining unit 19 shows an abnormality of the time T1 of the clock 18, the determination result from the flag determining unit 22 shows the presence of the history in which the content has been tried to be played back after the expiration of the time limit, or the determination result from the playback time limit determining unit 21 shows the elapse of the playback expiration date of the current time T1 of the clock 18. In these situations, the terminal device TM shifts to step 4f to refuse the playback of the content, and displays the fact on the LCD 162. If it is determined that the clock 18 has been adjusted within the certain time period in the past, and also if the playback time limit determining unit 21 determines that the current time T1 of the clock 18 has elapsed the playback expiration date in this state, in step 4g, the terminal device TM sets the flag to store it in the memory card MC by including it in the rights information.

As described above, in the third embodiment, the terminal device TM determines whether or not the time of the clock 18 has been adjusted to the standard time in the past certain time period. If it is determined that the time of the clock 18 has been adjusted to the standard time in the past certain time period, the terminal device TM records the time of the clock 18 in the timestamp file only in recording the content, and omits the update of the time of the clock 18 in playing back the content.

Accordingly, like the first embodiment, the time update processing of the timestamp files in playing back the content becomes useless, thereby, it becomes possible for the terminal device TM to decrease processing load thereof and smoothly play back the content without causing the playback delay, etc. In recording the content, the clocking time of the clock 18 is recorded in the timestamp file. Therefore, when another terminal device having only the self-running clock thereon intends to play back the content recorded on the memory card MC, the terminal device can perform time check of the self-running of the terminal device by using the recorded time of the timestamp file. Accordingly, it becomes possible to prevent the illegal playback of the content caused by the alteration of the self-running clock by the terminal device.

Furthermore, in the third embodiment, when it is determined that the time T1 of the clock 18 has not been adjusted to the standard time within the past certain time period, the terminal device TM determines the validity of the time T1 of the clock 18 by using the timestamp file then play backs the content, and also updates the times of the timestamp files to the content playback start times. Therefore, it becomes possible for the terminal device TM to find the delay and alteration relating to the time T1 of the clock 18 on the basis of the timestamp files updated at the time of the preceding playback of the content, thereby, the terminal device TM can surely prevent the illegal playback of the content.

Other Embodiment

Each of the aforementioned embodiments is configured in that when the clock 18 operates in a self-running mode, in playing back the content, the terminal device TM records the playback start time in the timestamp file among the playback start time and playback completion time of the content. However, the present invention is not limited to the embodiments, and the terminal device TM may record the playback completion time of the content. And at this moment, if the memory card MC is removed from the memory card interface 13 during the playback of the content, the terminal device TM may record the time at which the removing has been detected into the timestamp file. In this manner, the time of the timestamp file can be accurately updated.

Further, in each aforementioned embodiment, the case in which the terminal device TM acquires the standard time data from the base station in the CDMA mobile communication system is described as an example. However, the invention is not limited to the example, and the terminal device may have a global positioning system (GPS) receiving function to receive system time data transmitted from a GPS satellite by using the GPS receiving function, and also may have a standard time receiver to receive standard time information broadcast from a standard time broadcast station BS on, for instance, Mount Otaka in Fukushima prefecture in Japan.

Furthermore, the foregoing embodiments having been configured to perform prohibition determination by means of the flag to be set when it is determined that the content is out of the playback expiration date on the basis of the termination in playing back the content. However, other than these embodiments, determining the playback expiration date by using the validity of the rights information itself is a possible approach. This flag is information to indicate the validity if the time indicated by the secure clock is within the playback expiration date, or information to indicate the invalidity if the time is out of the playback expiration date.

The terminal device may be configured to prohibit the playback after running out the playback expiration date by deleting the rights information when it is determined that the content playback has been requested after the expiration of the playback time limit.

Other than this, it is possible to make a variety of modifications for the procedure and content of the content playback processing, the type of the terminal device, the encryption algorithm of the content and the like, without departing from the essential point of the invention.

To put it briefly, the present invention is not limited to the aforementioned embodiments as they are, on an implementation phase, this invention may be embodied in various forms without departing from the inventive concept thereof. Various types of the invention can be formed by appropriately combining a plurality of constituent elements disclosed in the foregoing embodiments. Some of the elements, for example, may be omitted from the whole of the constituent elements shown in the embodiments above. Further, the constituent elements over different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A terminal device having a function of recording content on a recording medium and also reading out the content from the recording medium to play back the content, the terminal device comprising:
    a clock configured to perform a clocking operation;
    a determination unit configured to determine whether the clock is a secure clock to perform a clocking operation in synchronization with standard time data acquired from outside or a self-running clock to autonomously perform the clocking operation;
    a timestamp file creation unit configured to, during recording of the content, create a timestamp file indicating a recording time of the content based on a clocking time of the clock and cause the timestamp file to be recorded on the recording medium, regardless of whether the clock is determined to be the self-running clock or the secure clock;
    a receiving unit configured to receive the content;
    a recording unit configured to record the received content on the recording medium; and
    a playback unit configured to play back the content recorded on the recording medium and output the played back content to an output unit;
    wherein the timestamp file creation unit is configured to, during playback of the content recorded on the recording medium, update the timestamp file of the content to a playback start time of the content or a playback completion time of the content based on a time measured by the secure clock, in response to a determination by the determination unit that the clock is the self-running clock; and
    wherein the timestamp file creation unit is configured to, during playback of the content recorded on the recording medium, not update the timestamp file of the content, in response to a determination by the determination unit that the clock is the secure clock.

2. The terminal device according to claim 1, wherein the receiving unit receives the content from a content server via a network.

3. The terminal device according to claim 1, wherein when the content comprises audio data, the playback unit converts the audio data into an analog signal and outputs the analog signal to the output unit, whereby the analog signal is output through a loudspeaker included in the output unit.

4. The terminal device according to claim 1, wherein when the content comprises video data, the playback unit displays the video data on a display device included in the output unit.

5. A terminal device having a function of recording content on a recording medium and also reading out the content from the recording medium to play back the content, the terminal device comprising:
- a secure clock configured to perform a clocking operation in synchronism with standard time data acquired from outside;
- a determination unit configured to determine whether a clocking correction operation of the secure clock based on the standard time data has been performed within a past certain time period;
- a timestamp file creation unit configured to, during recording of the content, create a timestamp file indicating a recording time of the content based on a clocking time of the secure clock and cause the timestamp file to be recorded on the recording medium, regardless of whether the clocking operation of the secure clock has been performed within the past certain time period;
- a receiving unit configured to receive the content;
- a recording unit configured to record the received content on the recording medium; and
- a playback unit configured to play back the content recorded on the recording medium and output the played back content to an output unit;

wherein the timestamp file creation unit is configured to, during playback of the content recorded on the recording medium, update the timestamp file of the content to a playback start time of the content or a playback completion time of the content based on a time measured by the secure clock, in response to a determination by the determination unit that the time correction operation of the secure clock has not been performed within the past certain time period; and wherein the timestamp file creation unit is configured to, during playback of the content recorded on the recording medium, not update the timestamp file of the content, in response to a determination by the determination unit that the time correction operation of the secure clock has been performed within the past certain time period.

6. The terminal device according to claim 5, wherein the receiving unit receives the content from a content server via a network.

7. The terminal device according to claim 5, wherein when the content comprises audio data, the playback unit converts the audio data into an analog signal and outputs the analog signal to the output unit, whereby the analog signal is output through a loudspeaker included in the output unit.

8. The terminal device according to claim 5, wherein when the content comprises video data, the playback unit displays the video data on a display device included in the output unit.

* * * * *